(12) United States Patent
Li

(10) Patent No.: US 10,353,456 B2
(45) Date of Patent: Jul. 16, 2019

(54) ADVERTISING MACHINE, AND SYSTEM, METHOD AND STORAGE MEDIUM FOR CONTROLLING ADVERTISING MACHINE

(71) Applicant: Boe Technology Group Co., Ltd., Beijing (CN)

(72) Inventor: Qingyong Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 178 days.

(21) Appl. No.: 15/503,128

(22) PCT Filed: Jul. 26, 2016

(86) PCT No.: PCT/CN2016/091692
§ 371 (c)(1),
(2) Date: Feb. 10, 2017

(87) PCT Pub. No.: WO2017/117976
PCT Pub. Date: Jul. 13, 2017

(65) Prior Publication Data
US 2018/0101221 A1    Apr. 12, 2018

(30) Foreign Application Priority Data

Jan. 4, 2016  (CN) .......................... 2016 1 0003504

(51) Int. Cl.
*G06F 9/00* (2006.01)
*G06F 1/3293* (2019.01)
(Continued)

(52) U.S. Cl.
CPC ............ *G06F 1/3293* (2013.01); *G06F 1/324* (2013.01); *H04N 21/41415* (2013.01); *H04N 21/4436* (2013.01); *H04N 21/6543* (2013.01)

(58) Field of Classification Search
CPC . G06F 1/3293; G06F 1/324; H04N 21/41415; H04N 21/4436; H04N 21/6543
(Continued)

(56) References Cited

U.S. PATENT DOCUMENTS 7,464,379 B2 * 12/2008 Kanai .................. G06F 1/3203
713/375
8,683,247 B2 * 3/2014 Lerman ................ G06F 1/3203
713/323
(Continued)

FOREIGN PATENT DOCUMENTS

| CN | 1822659 | 8/2006 |
|---|---|---|
| CN | 101715045 | 5/2010 |

(Continued)

OTHER PUBLICATIONS

First Office Action for Chinese Patent Application No. 201610003504.8 dated Feb. 6, 2018.
(Continued)

*Primary Examiner* — Aurel Prifti
(74) *Attorney, Agent, or Firm* — Calfee, Halter & Griswold LLP

(57) ABSTRACT

A system for controlling the advertising machine includes a standby control unit, an application processing unit and a power source unit. The application processing unit is configured to control an operation of the advertising machine. The power source unit is configured to provide power to the standby control unit, and provide power to the application processing unit under the control of the standby control unit. The standby control unit is configured to control a standby period and an operating period of the advertising machine according to a standby scheme, wherein during the standby period of the advertising machine, the power source unit is controlled to stop providing power to the application processing unit, and during the operating period of the adver-
(Continued)

tising machine, the power source unit is controlled to provide power to the application processing unit.

13 Claims, 4 Drawing Sheets

(51) Int. Cl.
  *G06F 1/324*     (2019.01)
  *H04N 21/414*    (2011.01)
  *H04N 21/443*    (2011.01)
  *H04N 21/6543*   (2011.01)

(58) Field of Classification Search
  USPC ............ 713/375, 323, 322, 324, 2, 320; 1/1;
  381/150; 455/574
  See application file for complete search history.

(56) References Cited

U.S. PATENT DOCUMENTS

| | | | |
|---|---|---|---|
| 8,763,043 B2 | 6/2014 | Sung et al. | |
| 8,838,187 B2* | 9/2014 | Zhao | G01R 31/382 455/574 |
| 9,086,749 B2* | 7/2015 | Pourbigharaz | G06F 3/0416 |
| 2007/0094444 A1* | 4/2007 | Sutardja | G06F 1/3203 711/112 |
| 2008/0184042 A1* | 7/2008 | Parks | G06F 1/3203 713/300 |
| 2008/0307240 A1* | 12/2008 | Dahan | G06F 1/06 713/320 |
| 2011/0055538 A1* | 3/2011 | Cho | G06F 9/4418 713/2 |
| 2013/0145396 A1 | 6/2013 | Sung et al. | |
| 2014/0082724 A1* | 3/2014 | Pearson | G06F 21/575 726/22 |
| 2014/0245294 A1 | 8/2014 | Kaul | |
| 2014/0267316 A1* | 9/2014 | Connell | G06T 1/20 345/503 |
| 2014/0304737 A1 | 10/2014 | Sung et al. | |
| 2014/0351618 A1* | 11/2014 | Connell | G06F 1/3265 713/323 |
| 2014/0359665 A1 | 12/2014 | Sung et al. | |
| 2015/0058650 A1* | 2/2015 | Varma | G06F 1/3293 713/324 |
| 2015/0082255 A1* | 3/2015 | DeVries | G06F 3/0488 715/863 |
| 2015/0253832 A1* | 9/2015 | Nishimoto | G06F 9/4403 713/323 |
| 2015/0334477 A1* | 11/2015 | Macours | G08B 3/10 381/150 |
| 2015/0370304 A1* | 12/2015 | Abu Salah | G06F 1/324 713/322 |
| 2016/0109934 A1* | 4/2016 | Woo | G06F 1/3293 345/211 |
| 2016/0132369 A1* | 5/2016 | Lee | G06F 1/3296 713/2 |
| 2016/0148615 A1* | 5/2016 | Lee | G10L 15/22 704/275 |
| 2016/0180837 A1* | 6/2016 | Gustavsson | G06F 1/3203 704/251 |
| 2016/0246356 A1* | 8/2016 | Tiwari | G06F 1/3287 |
| 2018/0367989 A1* | 12/2018 | Zhu | H04W 12/02 |

FOREIGN PATENT DOCUMENTS

| | | |
|---|---|---|
| CN | 102339122 | 2/2012 |
| CN | 103546804 | 1/2014 |
| CN | 103634663 | 3/2014 |
| CN | 203734748 U | 7/2014 |
| CN | 105611409 | 5/2016 |
| WO | 2011142498 | 11/2011 |

OTHER PUBLICATIONS

International Search Report for PCT/CN2016/091692 dated Oct. 25, 2016.

* cited by examiner

ADVERTISING MACHINE, AND SYSTEM, METHOD AND STORAGE MEDIUM FOR CONTROLLING ADVERTISING MACHINE

CROSS REFERENCE TO RELATED APPLICATIONS

The present application is a US national phase of PCT Application No. PCT/CN2016/091692, filed on Jul. 26, 2016, which is based upon and claims priority to Chinese Patent Application No. 201610003504.8, filed on Jan. 4, 2016, and the entire contents thereof are incorporated herein by reference.

TECHNICAL FIELD

The present disclosure relates to the field of display technology, and more particularly, to an advertising machine, and a system, a method and a storage medium for controlling the advertising machine.

BACKGROUND

Currently commercial available advertising-machine-type display devices, are continuously in unattended operation after been deployed. Generally, the advertising machines is configured to be turned on/off periodically to save power, and the advertising machine, when being turned off, starts a standby mode. In addition, in order to wake up the advertising machine automatically at the start of the operating period, application processing chips and peripheral circuits of the advertising machine are required to maintain operating continuously.

With the improvements of the function of the advertising machine, basic frequency and integration level of the application processor in the advertising machine is becoming higher and higher, which results in a relatively higher power consumption of the standby circuits, thereby seriously wasting power and shortening lifespan of the advertising machine.

It should be noted that, information disclosed in the above background portion is provided only for better understanding of the background of the present disclosure, and thus it may contain information that does not form the prior art known by those ordinary skilled in the art.

SUMMARY

The present disclosure provides an advertising machine, and a system, a method and a storage medium for controlling the advertising machine.

According to one aspect of the present disclosure, there is provided a system for controlling an advertising machine, including a standby control unit, an application processing unit and a power source unit. The application processing unit is configured to control an operation of the advertising machine. The power source unit is configured to provide power to the standby control unit, and provide power to the application processing unit under the control of the standby control unit. The standby control unit is configured to control the standby period and operating period of the advertising machine according to a standby scheme, wherein during the standby period of the advertising machine, the power source unit is controlled to stop providing power to the application processing unit, and during the operating period of the advertising machine, the power source unit is controlled to provide power to the application processing unit.

According to another aspect of the present disclosure, there is provided an advertising machine including the system for controlling the advertising machine according to the present disclosure.

According to another aspect of the present disclosure, there is provided a method for controlling an advertising machine including the system for controlling the advertising machine according to the present disclosure, the method includes: the standby control unit controls the power source unit to stop providing power to the application processing unit when controlling the advertising machine to start a standby period according to the standby scheme; and the standby control unit controls the power source unit to provide power to the application processing unit when controlling the advertising machine to start an operating period according to the standby scheme.

According to another aspect of the present disclosure, there is provided an advertising machine, comprising a processor; and a memory for storing instructions executable by the processor. The processor is configured to perform a method for controlling the advertising machine comprising the above system for controlling the advertising machine. The method comprises controlling the power source unit, by the standby control unit, to stop providing power to the application processing unit when controlling the advertising machine to start a standby period according to the standby scheme; and controlling the power source unit, by the standby control unit, to provide power to the application processing unit when controlling the advertising machine to start an operating period according to the standby scheme.

According to another aspect of the present disclosure, there is provided a non-transitory computer-readable storage medium having stored therein instructions that, when executed by a processor of an advertising machine, causes the advertising machine to perform a method for controlling the advertising machine comprising the above system for controlling the advertising machine, the method comprising:

controlling the power source unit, by the standby control unit, to stop providing power to the application processing unit when controlling the advertising machine to start a standby period according to the standby scheme; and controlling the power source unit, by the standby control unit, to provide power to the application processing unit when controlling the advertising machine to start an operating period according to the standby scheme.

It is to be understood that both the foregoing general description and the following detailed description are exemplary and explanatory only and are not restrictive of the invention, as claimed.

This section provides a summary of various implementations or examples of the technology described in the disclosure, and is not a comprehensive disclosure of the full scope or all features of the disclosed technology.

BRIEF DESCRIPTION OF THE DRAWINGS

The accompanying drawings, which are incorporated in and constitute a part of this specification, provide further explanation of the present disclosure and, together with the description, serve to explain the present disclosure, rather than limiting the present disclosure.

DETAILED DESCRIPTION

Reference signs and denotations thereof:
1. Standby Control Unit;
11. First Processing Module;
12. Control Module;
13. Interruption Request Module;
14. First Communication Module;
15. Storage Module;
16. Clock Module;
2. Application Processing Unit;
21. Second Processing Module;
22. Peripheral Circuit Module;
23. Configuring module;
24. Second Communication Module;
3. Power Source Unit;
4. Input Unit;
5. Indicator Unit;
6. Backend Server; and
7. Clock Unit.

Hereinafter, the advertising machine and the system and method for controlling the advertising machine according to the present disclosure will be described in further detail with reference to the accompanying drawings and particular embodiments of the present disclosure, such that those skilled in the art may have a better understanding of technical solutions of the present disclosure.

Figure 1:
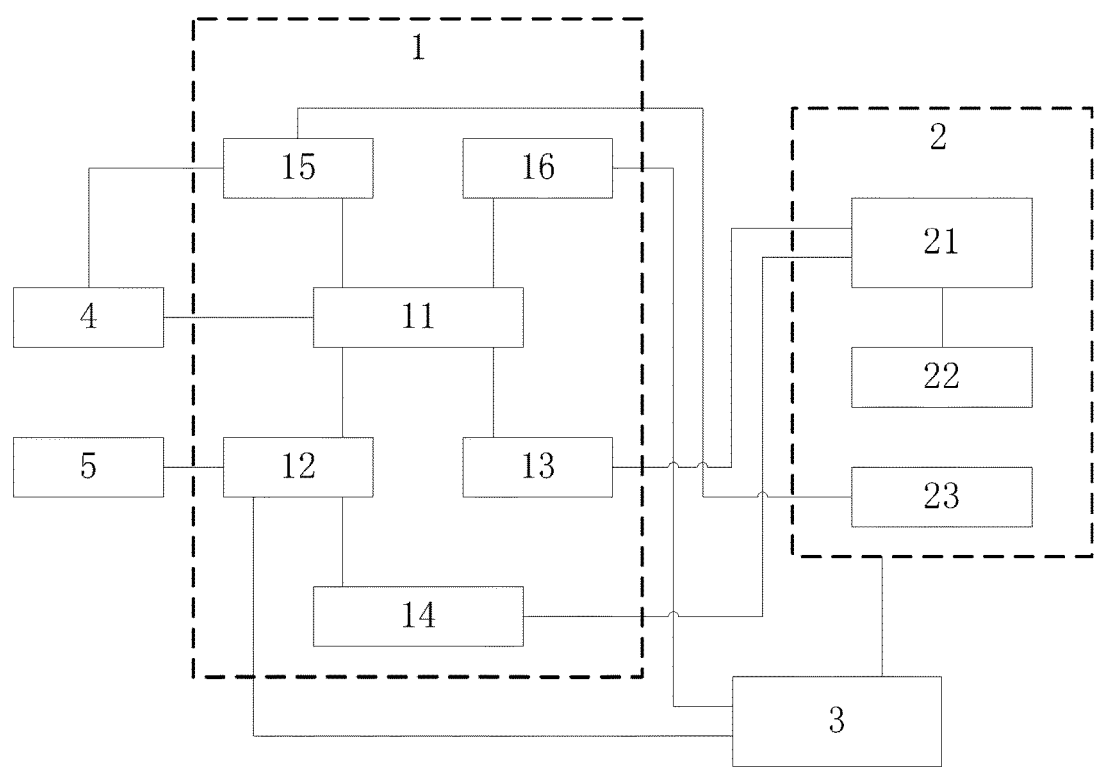
FIG. 1 is a block diagram illustrating a system for controlling an advertising machine according to an embodiment of the present disclosure.

FIG. 1 is a block diagram illustrating a system for controlling an advertising machine according to an embodiment of the present disclosure.

As illustrated in FIG. 1, the system for controlling the advertising machine according to embodiments of the present aspect may include a standby control unit 1, an application processing unit 2 and a power source unit 3. The application processing unit 2 is configured to control an operation of the advertising machine. The power source unit 3 is configured to provide power to the standby control unit 1, and provide power to the application processing unit 2 under the control of the standby control unit 1. The standby control unit 1 is configured to control the standby period and operating period of the advertising machine according to a standby scheme, wherein during the standby period of the advertising machine, the power source unit 3 is controlled to stop providing power to the application processing unit 2 such that the advertising machine stops operating, and during the operating period of the advertising machine, the power source unit 3 is controlled to provide power to the application processing unit 2 such that the advertising machine starts to operate.

In the system for controlling the advertising machine, by controlling the standby control unit 1, the application processing unit 2 of the advertising machine is allowed to stop operating during the standby period of the advertising machine, thereby lowering standby power consumption of the advertising machine, saving power and meanwhile prolonging lifespan of the advertising machine.

According to embodiments of the present disclosure, the standby control unit 1 may include a first processing module 11, a control module 12, an interruption request module 13 and a first communication module 14. The first processing module 11 is configured to send a turn-off instruction to the interruption request module 13 according to the standby scheme and send a turn-on instruction to the control module 12 according to the standby scheme. The interruption request module 13 is configured to send an interruption request to the application processing unit 2 after receiving the turn-off instruction. The first communication module 14 is configured to receive an interruption request response instruction returned by the application processing unit 2 and send the interruption request response instruction to the control module 12. The control module 12 is configured to control the power source unit 3 to stop providing power to the application processing unit 2 according to the interruption request response instruction such that the application processing unit 2 stops operating, and control the power source unit 3 to provide power to the application processing unit 2 according to the turn-on instruction such that the application processing unit 2 starts to operate. Upon reception of the turn-off instruction, the control module 12 controls the power source unit 3 to stop providing power to the application processing unit 2, and thus the application processing unit 2 consumes no power during the standby period of the advertising machine, thereby lowering the standby power consumption of the advertising machine.

According to embodiments of the present disclosure, the standby control unit 1 may further include a storage module 15 and a clock module 16. The storage module 15 is configured to store the standby scheme. The clock module 16 is configured to provide a clock signal to the standby control unit 1. In particular, the clock module 16 may control the timing. When a standby time set in the standby scheme is reached, the standby control unit 1 controls the advertising machine to start a standby mode. Meanwhile, the standby control unit 1 controls the power source unit 3 to stop providing power to the application processing unit 2, such that the application processing unit 2 stops operating. When the turn-on time set in the standby scheme is reached, the standby control unit 1 controls the advertising machine to start an operating mode. Meanwhile, the standby control unit 1 controls the power source unit 3 to provide power to the application processing unit 2, such that the application processing unit 2 begins to operate. By providing the clock module 16, the advertising machine may be automatically switched between the standby period and the operating period. Since the clock module 16 is required to continuously operate during the standby mode and the operating mode of the advertising machine, the clock module 16 is powered by the power source unit 3 when the advertising machine is powered (including the standby mode and the operating mode), and is powered by a battery when the advertising machine is out of power. The battery prevents timing data from being lost during the power outage.

According to embodiments of the present disclosure, the system for controlling the advertising machine may further include an input unit 4 configured to input the standby scheme to the standby control unit 1. The standby scheme may be manually input to the standby control unit 1 directly by providing the input unit 4, i.e., the standby scheme may be input to the standby control unit 1 in a manual manner. Further, instructions, e.g., a standby instruction or a turn-on instruction, may be directly input to the standby control unit 1 via the input unit 4, such that the standby control unit 1 performs a standby operation or a turn-on operation immediately after receiving the instructions. According to embodiments of the present disclosure, the input unit 4 may be a manual input device such as a remote control or a keyboard.

According to embodiments of the present disclosure, the application processing unit 2 may include a second processing module 21 and a peripheral circuit module 22. The second processing module 21 is configured to: after receiving the interruption request, save the currently played file of the advertising machine, control the advertising machine to display a turning off message, and meanwhile return the interruption request response instruction to the standby control unit 1. The peripheral circuit module 22 is configured to maintain an operation of the advertising machine under the control of the second processing module 21. By providing the second processing module 21, data lost may be prevented when turning the advertising machine into the standby mode. During the standby mode of the advertising machine, both the second processing module 21 and the peripheral circuit module 22 stop operating, thereby greatly lowering standby power consumption of the advertising machine.

According to embodiments of the present disclosure, the application processing unit 2 may include a configuring module 23, configured to preset the standby scheme and send the standby scheme to the standby control unit 1. By providing the configuring module 23, the user may configure the standby scheme in the application processing unit 2 directly, and then the application processing unit 2 sends the standby scheme to the standby control unit 1. The standby control unit 1 may store the standby scheme in the storage module 15 to control the standby period of the advertising machine according to the standby scheme. In addition, the standby scheme will not be lost during the standby period of the advertising machine.

According to various embodiments of the present disclosure, the standby scheme may be directly input into the standby control unit 1 manually using the input unit 4, or may be previously configured in the application processing unit 2 by the configuring module 23 in the application processing unit 2, and then been sent to the standby control unit 1 by the application processing unit 2. According to embodiments of the present disclosure, only one set of standby scheme is stored in the standby control unit 1. When a new standby scheme is received and stored in the storage module 15, the previously stored standby scheme will be overwritten (i.e., replaced).

According to embodiments of the present disclosure, the system for controlling the advertising machine may further include an indicator unit 5, configured to indicate an operating mode and a standby mode of the advertising machine under the control of the standby control unit 1. According to embodiments of the present disclosure, the indicator unit 5 may employ indicator devices such as an LED indicator, a buzzer or other acousto-optic devices. By providing the indicator unit 5, it may facilitate people to learn about the state of the advertising machine (e.g., the standby mode or the operating mode).

Figure 2:
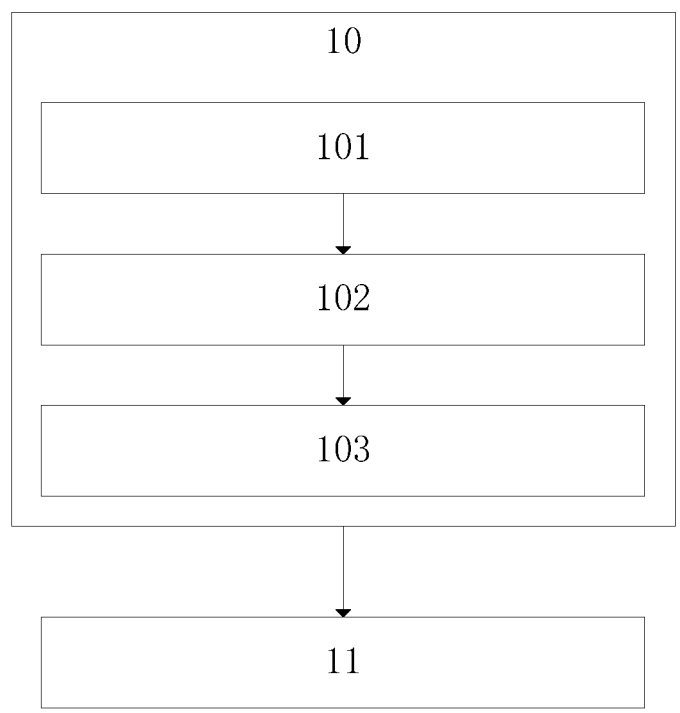
FIG. 2 is a flow chart illustrating a method for controlling an advertising machine according to an embodiment of the present disclosure.

FIG. 2 is a flow chart illustrating a method for controlling an advertising machine according to an embodiment of the present disclosure.

As illustrated in FIG. 2, the method for controlling the advertising machine according to embodiments of the present disclosure may include the following steps.

In step 10, when the standby control unit controls the advertising machine to start a standby period according to the standby scheme, the standby control unit controls the power source unit to stop providing power to the application processing unit.

In step 11, when the standby control unit controls the advertising machine to start an operating period according to the standby scheme, the standby control unit controls the power source unit to provide power to the application processing unit.

The step 10 may include the following steps.

In step 101, when a turn-off instruction is received, the standby control unit sends interruption request information to the application processing unit.

In step 102, after the application processing unit receives the interruption request information, the application processing unit saves the currently played file of the advertising machine, controls the advertising machine to display a turning off message, and meanwhile returns interruption request response information to the standby control unit.

In step 103, after the standby control unit receives the interruption request response information, the standby control unit controls the power source unit to stop providing power to the application processing unit.

Figure 3:
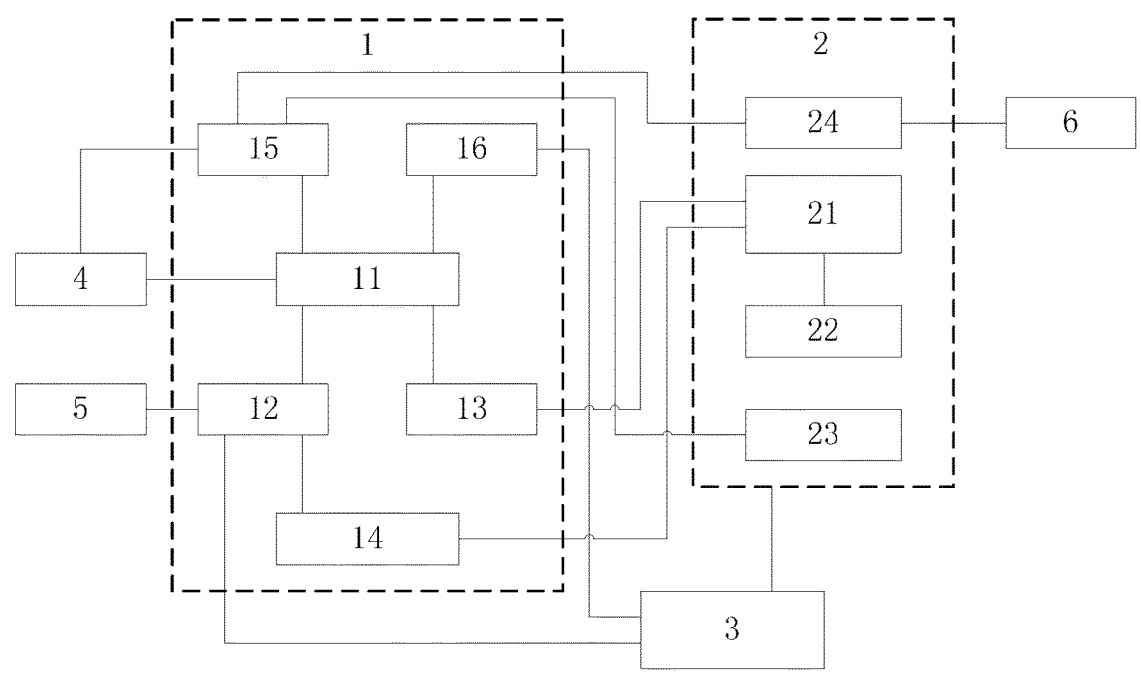
FIG. 3 is a block diagram illustrating a system for controlling an advertising machine according to another embodiment of the present disclosure.

FIG. 3 is a block diagram illustrating a system for controlling an advertising machine according to another embodiment of the present disclosure.

As illustrated in FIG. 3, the system for controlling the advertising machine according to the present embodiment differs from the system for controlling the advertising machine illustrated in FIG. 1 in that: the application processing unit 2 may include a second communication module 24, configured to receive the standby scheme pushed from a backend server 6 and send the standby scheme to the standby control unit 1.

According to the present embodiment, by presetting the standby scheme on the backend server 6 via a network and then the backend server 6 pushing the standby scheme to the application processing unit 2, the second communication module 24 of the application processing unit 2, after receiving the standby scheme pushed from the backend server 6, sends the standby scheme to the standby control unit 1.

It should be noted that, according to the present embodiment, the application processing unit 2 may or may not include a configuring module 23.

Figure 4:
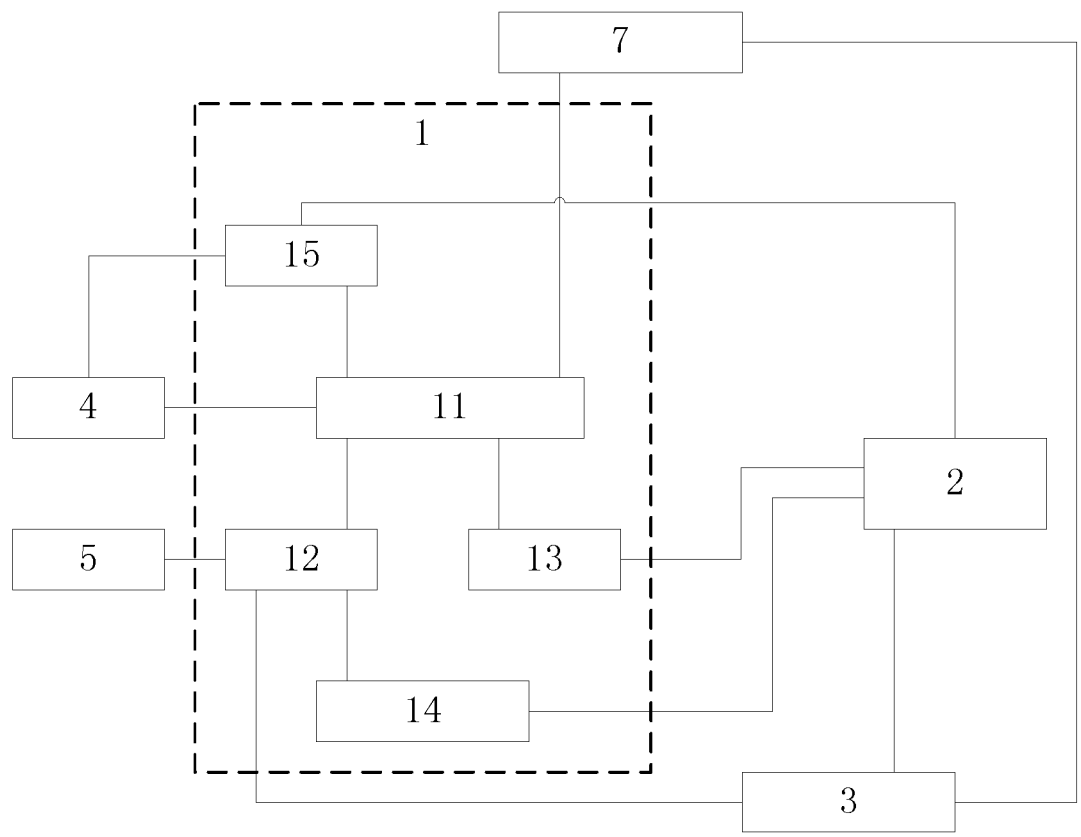
FIG. 4 is a block diagram illustrating a system for controlling an advertising machine according to another embodiment of the present disclosure.

FIG. 4 is a block diagram illustrating a system for controlling an advertising machine according to another embodiment of the present disclosure.

As illustrated in FIG. 4, the system for controlling the advertising machine according to the present embodiment differs from the system for controlling the advertising machine illustrated in FIG. 1 in that: the standby control unit 1 does not include the clock module, instead, the system for controlling the advertising machine further includes a clock unit 7, configured to provide a clock signal to the standby control unit 1. That is, in the system for controlling the advertising machine according to the present embodiment, the clock signal is provided to the standby control unit 1 from an external clock unit 7.

In particular, the clock unit 7 may control the timing. When a standby time set in the standby scheme is reached, the standby control unit 1 controls the advertising machine to start a standby mode. Meanwhile, the standby control unit 1 controls the power source unit 3 to stop providing power to the application processing unit 2, such that the application processing unit 2 stops operating. When the turn-on time set in the standby scheme is reached, the standby control unit 1 controls the advertising machine to start an operating mode. Meanwhile, the standby control unit 1 controls the power source unit 3 to provide power to the application processing unit 2, such that the application processing unit 2 begins to operate. By providing the clock unit 7, the advertising machine may be automatically switched between the standby period and the operating period. Since the clock unit 7 is required to continuously operate during the standby mode and the operating mode of the advertising machine, the clock unit 7 is powered by the power source unit 3 in the operating mode of the advertising machine, and the clock unit 7 is powered by a battery when the advertising machine is in the standby mode or out of power. The battery prevents timing data from being lost during the power outage.

In the system for controlling the advertising machine according to various embodiments of the present disclosure, by providing the standby control unit, the application processing unit of the advertising machine is allowed to stop operating during the standby period of the advertising machine, thereby lowering standby power consumption of the advertising machine, saving power and meanwhile prolonging lifespan of the advertising machine.

The system for controlling the advertising machine according to various embodiments of the present disclosure may be applied to various advertising machines.

It should be appreciated that, the above embodiments are exemplary implementations for illustrating the principle of the present disclosure, while the present disclosure is not limited thereto. Various modifications and improvements can be made by those ordinary skilled in the art without departing from the spirit and essential of the present disclosure. All these modifications and improvements will also fall into the protection scope of the present disclosure.

What is claimed is:

1. A system for controlling an advertising machine, comprising:
    a standby controller;
    an application processor configured to control an operation of the advertising machine; and
    a power source configured to provide power to the standby controller, and provide power to the application processor under a control of the standby controller,
    wherein the standby controller is configured to control a standby period and an operating period of the advertising machine according to a standby scheme, and wherein during the standby period of the advertising machine, the power source is controlled to stop providing power to the application processor, and during the operating period of the advertising machine, the power source is controlled to provide power to the application processor,
    wherein the standby controller comprises:
    an interruption request component;
    a controlling component;
    a first processing component configured to send a turn-off instruction to the interruption request component according to the standby scheme and send a turn-on instruction to the controlling component according to the standby scheme; and
    a first communication component configured to receive an interruption request response instruction returned by the application processor and send the interruption request response instruction to the controlling component,
    wherein the interruption request component is configured to send an interruption request to the application processor after receiving the turn-off instruction, and
    the controlling component is configured to control the power source to stop providing power to the application processor according to the interruption request response instruction, and control the power source to provide power to the application processor according to the turn-on instruction, and
    wherein the application processor comprises:
    a second processing component configured to: after receiving the interruption request, save the currently played file of the advertising machine, control the advertising machine to display a turning off message, and meanwhile return the interruption request response instruction to the standby controller; and
    a peripheral circuit component configured to maintain an operation of the advertising machine under the control of the second processing component.

2. The system for controlling the advertising machine according to claim 1, wherein the standby controller comprises:
    a storage component configured to store the standby scheme; and
    a clock component configured to provide a clock signal to the standby controller.

3. The system for controlling the advertising machine according to claim 1, further comprising an input device, configured to input the standby scheme to the standby controller.

4. The system for controlling the advertising machine according to claim 1, wherein the application processor comprises a configuring component, configured to preset the standby scheme and send the standby scheme to the standby controller.

5. The system for controlling the advertising machine according to claim 1, wherein the application processor comprises a second communication component, configured to receive the standby scheme pushed from a backend server and send the standby scheme to the standby controller.

6. The system for controlling the advertising machine according to claim 1, further comprising a clock, configured to provide a clock signal to the standby controller.

7. The system for controlling the advertising machine according to claim 1, further comprising an indicator, configured to indicate an operating mode and a standby mode of the advertising machine under the control of the standby controller.

8. An advertising machine, comprising the system for controlling the advertising machine according to claim 1.

9. A method for controlling an advertising machine comprising the system for controlling the advertising machine according to claim 1, the method comprising:
    controlling the power source, by the standby controller, to stop providing power to the application processor when controlling the advertising machine to start a standby period according to the standby scheme; and
    controlling the power source, by the standby controller, to provide power to the application processor when controlling the advertising machine to start an operating period according to the standby scheme.

10. The method for controlling the advertising machine according to claim 9, wherein:
    when a turn-off instruction is received, the standby controller sends interruption request information to the application processor;
    after receiving the interruption request information, the application processor saves the currently played file of the advertising machine, controls the advertising machine to display a turning off message, and meanwhile returns interruption request response information to the standby controller; and after receiving the interruption request response information, the standby controller controls the power source to stop providing power to the application processor.

11. An advertising machine according to claim 1, comprising:
   a processor; and
   a memory for storing instructions executable by the processor,
   wherein the processor is configured to perform a method for controlling the advertising machine comprising the system for controlling the advertising machine, the method comprising:
   controlling the power source, by the standby controller, to stop providing power to the application processor when controlling the advertising machine to start a standby period according to the standby scheme; and
   controlling the power source, by the standby controller, to provide power to the application processor when controlling the advertising machine to start an operating period according to the standby scheme.

12. The advertising machine according to claim 11, wherein:
   when a turn-off instruction is received, the standby controller sends interruption request information to the application processor;
   after receiving the interruption request information, the application processor saves the currently played file of the advertising machine, controls the advertising machine to display a turning off message, and meanwhile returns interruption request response information to the standby controller; and
   after receiving the interruption request response information, the standby controller controls the power source to stop providing power to the application processor.

13. A non-transitory computer-readable storage medium having stored therein instructions that, when executed by a processor of an advertising machine, causes the advertising machine to perform a method for controlling the advertising machine comprising the system for controlling the advertising machine according to claim 1, the method comprising:
   controlling the power source, by the standby controller, to stop providing power to the application processor when controlling the advertising machine to start a standby period according to the standby scheme; and
   controlling the power source, by the standby controller, to provide power to the application processor when controlling the advertising machine to start an operating period according to the standby scheme.

* * * * *